United States Patent [19]

Rist et al.

[11] Patent Number: 4,903,297
[45] Date of Patent: Feb. 20, 1990

[54] RESTRICTED ACCESS TELEVISION TRANSMISSION SYSTEM

[75] Inventors: Bruno A. Rist, Woodland Hills, Calif.; Adrian J. DeVries, Aurora, Ill.

[73] Assignee: International Telesystems, Inc., Beverly Hills, Calif.

[21] Appl. No.: 267,964

[22] Filed: Nov. 7, 1988

Related U.S. Application Data

[63] Continuation-in-part of Ser. No. 934,810, Nov. 25, 1986, Pat. No. 4,825,467.

[51] Int. Cl.$^4$ .......................... H04N 7/467; H07H 7/00
[52] U.S. Cl. ........................................... 380/7; 380/16; 455/1
[58] Field of Search ........................... 380/7, 16; 455/1

[56] References Cited

U.S. PATENT DOCUMENTS

| | | | |
|---|---|---|---|
| 3,202,758 | 8/1965 | Browstein | 380/7 |
| 4,748,667 | 5/1988 | Farmer et al. | 380/7 |
| 4,825,467 | 4/1989 | Rist et al. | 380/7 |

Primary Examiner—Salvatore Cangialosi
Attorney, Agent, or Firm—David O'Reilly

[57] ABSTRACT

A Television Signal Transmission Security System which provides a higher degree of security then previously possible by utilizing encoding and decoding technology which effectively prevents pirating by amateurs or experimenters. The television signal transmitted is encoded by injecting one or more modulated interfering signals in specific frequency slots in close proximity to the video carrier. Continuous or alternating interfering signals can be injected either above or below the video carrier between harmonics of the horizontal frequencies. Combinations of interfering signals provide coding techniques making the system virtually pirate proof. The interfering signal is removed by very narrow band rejection filters having a rejection band attenuation greater than about 40 dB over a bandwidth equal to the bandwidth between adjacent harmonics of the horizontal sweep frequency. The filters are constructed using advanced technology to produce the quartz crystal bulk resonators or surface acoustic wave filters. Pre-compensation at the transmitter improves overall amplitude and phase response to provide a nearly perfect decoded picture.

77 Claims, 8 Drawing Sheets

RESTRICTED ACCESS TELEVISION TRANSMISSION SYSTEM

This application is a Continuation-in-Part Application of application Ser. No. 934,810, filed Nov. 25, 1986 now U.S. Pat. No. 4,825,467.

FIELD OF THE INVENTION

The invention relates to television transmission security systems and more particularly relates to a television encoding and decoding apparatus and system which substantially prevents unauthorized access to television signal transmissions.

BACKGROUND OF THE INVENTION

Since the advent of Cable Television a variety of methods have been proposed and implemented to secure Pay Television against unauthorized access.

The present practical security systems offer both active and passive systmes which are designed to prevent non-subscribers from watching a Pay T.V. Premium Channel. In a passive system the signal is filtered out by a trap at each non-subscriber's location; in an active system the signal is mutilated or coded such that only a subscriber with a decoder supplied by the Pay T.V. company can restore the signal such that it can be viewed.

The traps in a passive system are typically mounted at the take-off point of the cable to the subscriber. Those traps are often illegally removed or tampered with by other means. Each non-subscriber needs a trap, resulting in a high capital investment for those Premium programs which have a relatively low saturation. It is further physically impossible in practice to remove or add traps just for a Pay-Per-View programs, for which the subscriber has to pay a special charge. In an active system the signal is scrambled before it is distributed. Two types of active systems are in use. In one type the subscriber receives from the Pay T.V. company a decoder which decodes the signal all the time. In the second type, either by addressable decoders or by other means the subscriber can only watch those specific programs for which he pays.

It has been proven very difficult to design a secure TV coding system for a reasonable cost. As a result, in many systems simple decoders can be bought, made by entrepeneurs not related to the Pay T.V. company, which decode the signal such that the viewer does not have to pay the Pay TV Company. In other systems which are more secure, the decoders are extremely complex and therefore very expensive.

Another complication arises in the case of Pay-per-View programs. In that case the Pay TV Company has to install an expensive decoder in the home of each potential customer, without any assurance that the customer will ever buy a program. This requires a very large capital investment by the Pay-T.V. operator.

This invention relates specifically to active security systems and the invention offers a solution to provide secure decoders at a low cost with the added advantage that Pay-per-View programs can be easily accommodated with a minimum investment by the Pay TV company.

In one particular active system the synchronization signals are modified such that a regular television receiver cannot synchronize to the signal. The disruption of synchronizing signals is inadequate because it may be easily circumvented. A technician of moderate ability can construct a decoder to stabilize the synchronization of the receiving television set.

Systems which inject an interfering or scrambling signal between the video and audio carrier are also known. Such systems are disclosed and described in U.S. Pat. Nos. 3,896,262 and 4,074,311 incorporated herein by reference. The advantage of the system of the latter patent is that it is very effective in interfering both with the video and audio carrier to prevent reception of a usable television signal at the user or subscriber end. An additional advantage of this system is the low cost of the decoder needed for removing the interfering or scrambling signal. However his system suffers from the disadvantage that the decoders, though inexpensively produced, can be also produced by pirates with only moderate technical knowledge and ability. The decoders are easily reproduced since they use circuitry made up of standard components, which can be easily obtained, to remove the interfering signal. This restriction is the result of the necessity of placing the scrambling signal a sufficient distance from the video and audio carriers to allow removal without removing a substantial amount of, and degrading, the video signal. The reason for this is that circuitry made up of standard discrete components can only produce an inefficient notch filter which will remove too much of the video information if the interfering carrier is too close to the video signal. The system of the latter patent is thus limited to using an interfering carrier near the center of the band between the video and audio carriers.

Pirating of scrambled T.V. signals is a serious problem in the Pay T.V. industry. There is at present no economical fully secure system and the need remains for a secure, economical Pay T.V. Transmission system to make Pay T.V. and particularly "Pay-per-View" a desirable business proposition.

Noting that an economical, near fully secure Pay T.V. system would be an outstanding advance in the industry it is therefore one object of the present invention to provide a low cost television signal transmission security system which may not be circumvented using standard, easily available components.

Another object of the present invention is to provide a television signal transmission system secure against pirating by even skilled artisans.

Still another object of the present invention is to provide a restricted access television signal transmission system in which the technology for the system decoders is valid even beyond VHF frequencies.

Yet another object of the present invention is to provide a secure television transmission system utilizing decoder technology which permits sophisticated coding techniques to be used. The coding techniques used involve multiple different interfering frequencies at different times or from program to program. Decoding efficiency allows the use of coding techniques such as using several interfering carriers, once thought impractical.

Another object of the present invention is to provide a sophisticated coding technique of giving the appearance of several interfering carriers by alternately shifting the frequency of a single interfering carrier.

Yet another object of the present invention is to provide a sophisticated coding technique of modulating an interfering carrier with one or more modulating frequency signals.

Another object of the present invention is to produce a system having a high degree of security in which picture degradation, when removing an interfering carrier or carriers, is minimized. High efficiency and narrow band sophisticated decoders reduce the loss of video information to an insignificant amount.

Still another object of the present invention is to minimize temperature and aging effects by using stable, solid state technology. The critical elements of the decoder are constructed of Quartz or possibly other very stable materials such that no significant drift due to temperature and aging is anticipated.

Still another object of the invention is to provide a television signal transmission system having a high degree of security using high-technology, solid state manufacturing technology which allows batch processing at low cost but provides high security due to the lack of access to this technology by the typical pirate.

Still another object of the present invention is to provide a highly secure television signal transmission system using Solid State Quartz technology to produce, at low cost, highly selective decoders which cannot be reproduced by using standard, discrete circuit components.

Still another object of the invention is to provide means to compensate for the effect of the filters on the video quality.

BRIEF DESCRIPTION OF THE INVENTION

This invention relates to a television signal transmission system which provides a higher degree of security then previously thought possible by utilizing encoding and decoding technology which effectively prevents pirating by amateurs or experimenters and reduces the potential for pirating by even the most sophisticated technicians by the extremely stringent requirements of the decoders.

The spectrum of the luminance part of a television signal is characterized by a periodic structure of bands of frequencies with a high spectral intensity interleaved with bands of frequencies with a low spectral intensity. The spectral intensity is high in bands which are separated from the video carrier by a whole number of multiples of the horizontal scanning frequencies (15,734 Hertz in a color T.V. signal) and low for bands which are in-between those high intensity bands and which are centered around half multiples of this horizontal frequency. This is true for signals up to about 1 MHz above the video carrier.

Color signals are modulated on a subcarrier such that their spectral intensity is highest at half harmonics of the horizontal frequencies, but their magnitude is typically quite low in a band of +/− 1 MHz above and below the video carrier.

Another characteristic of the video signal is that the spectral intensity due to this luminance signal decreases rapidly for spectral components far away from the carrier. The frequency bands ranging from 20 to 30 harmonics of the horizontal below the video carrier to 20 to 30 harmonics above the video carrier contain the bulk of the energy contained in the luminance signal. Disrupting any of those bands around the harmonics will do severe harm to the demodulated signal. Furthermore scrambling carriers injected into those bands will be very effective in disturbing the T.V. signal.

If a scrambling carrier or signal is injected in close proximity to an harmonic of the horizontal, subsequent filtering in the decoder to remove the scrambling signal may also remove some of the important spectral components due to the luminance signal and the resulting picture will be irreparably damaged. The scrambling carriers therefore should be placed in-between the harmonics of the horizontal frequency and the filters in the decoder should be so narrow in the frequency domain, or so highly selective, that the spectral component due to the luminance signal around harmonics of the horizontal will not be materially disturbed.

Preferably the interfering carrier or signal is modulated, because modulation can enhance the scramble effectiveness and produce a flicker effect which is irritating. This modulation of the interfering carrier also can enhance security because any imperfect attempt by a pirate to remove the interfering carrier to restore the picture will leave a residual flicker in the picture which a customer will be reluctant to accept. The modulation bandwidth can be up to near the bandwidth of the selected filters used to remove the interfering carrier. Preferably the modulation of the interfering carrier in an encoder is at a frequency of approximately 75 to 100 hertz, with 85 hertz preferred. With this modulation the interfering carrier bandwidth would be approximately 170 hertz.

While this 85 hertz modulation will produce the flicker effect desired, it can be further enhanced by a second modulation signal in the range of 10 to 15 hertz. Through experiment and analysis it was determined that a dual frequency modulation works quite well. The total maximum bandwidth of the interfering carrier would remain approximately 170 hertz, or plus or minus 85 hertz, because the bandwidth produced by the 10 to 70 hertz modulation is less than the modulation produced by the 85 hertz. Thus, a modulated interfering carrier bandwidth of up to 200 hertz would fit comfortably into the preferred bandwidth of 500 to 2 kilohertz 40 db bandwidth of the notch filter for complete removal of the interfering carrier.

The purpose of the present invention is therefore to encode the signal by injecting one or more interfering carriers in specific frequency slots in close proximity to the video carrier into a television signal transmission while those carriers can only be removed by highly selective, high technology decoders.

Those injected carriers therefore cannot be removed by the usual standard component circuits as that disclosed and described in U.S. Pat. No. 4,074,311. More specifically carriers will be injected into a band of about 600 kHz, centered around the video carrier corresponding to a bandwidth of about 10% in relation to the bandwidth of 6 MHz of a TV channel.

Generally this system is applicable to Cable T.V. Systems which very often utilize Pay channels, but the system may also be used for over the air transmission.

The system described and disclosed herein is a low cost, versatile and extremely reliable, almost fully secure television transmission system that has significant advantages over existing systems. The system uses a scrambling scheme similar to the one proven in the above identified patents. In common is, therefore, the addition of an interfering carrier to obliterate both visual and audio signals and the removal of that interfering carrier to a sufficient degree to restore proper operation. However the system disclosed herein utilizes interfering signals far outside the possible or practical range of interfering signals possible with the system disclosed in that patent.

The problem with the previously disclosed systems is, while effective in creating an interfering signal which can be removed to a reasonable degree, that practical compromises were required, plaguing the system and preventing widespread acceptance. Among these problems is "soft" security that must be accepted because the system could be easily circumvented and so the system had to be minimal in cost.

The problems of the old system have been obviated by applying new Solid State, High Technology to produce decoders which achieve new cost and performance breakthroughs and allow more versatile and nearly fully secure scramble method at the head end. The operating principles are relatively simple but the subtleties of the system and the stringent requirements necessary for successfully removing the interfering carrier discourage tampering and piracy.

In the present invention the interfering carrier is moved so close to the video carrier that it is very difficult to remove that carrier with standard components without removing at the same time a substantial part of the video carrier. Without the carrier, detection becomes very difficult. Even if enough carrier is maintained to perform detection, so many critical modulated video components will be removed that the resulting picture will be heavily distorted and will not properly synchronize. The security afforded by the new invention will thus effectively prevent tampering by amateurs and experimenters and discourages efforts by even technologically able pirates.

An important but unique feature of the invention is that several interfering carriers can be used in combination which will provide coding techniques which are virtually pirate proof. For example, at least one or more interfering carriers could be injected in the before mentioned 10% frequency interval around the carrier while other interfering signals could be anywhere between the video and audio carrier beyond the 10% range. The large number of possible locations for interfering carriers would allow coding techniques with a very large number of combinations. If a single carrier would be used, the before mentioned 600 kHz band will allow about 38 different codes. If two carriers are used about 1400 codes are available while three carriers gives more than 50,000 combinations. If in addition to this, additional carriers would be used outside this 600 kHz band the number of available codes would become very large indeed.

Security can be further improved over using a single interfering carrier by using intermittent interfering carriers, or alternately shifting the interfering carrier from one frequency to another. The interfering carriers will time share the spectrum by having an interfering carrier in one slot or frequency between harmonics and then moving it to another slot and then perhaps moving it to a third or more slots. The interfering carrier would then be moved back at some rate to the first slot that again will enhance the effectiveness of the scrambling, because the procedure also enhances the flicker effect.

By turning one interfering carrier off before you turn the other one on, and by controlling the rate of rise of the amplitude of the carrier, no out of band harmonics are produced. Therefore, the interfering carriers, as they occupy different positions, will be attenuated by an equal number of filters at those positions. Whenever an interfering carrier is in a given position an assigned notch filter will remove that interfering carrier. When the carrier is then moved to the next position where there is a filter, it will also be removed. If one of the filters, however, is tuned to a different frequency the transmitted signal will remain scrambled because there is now a scramble carrier in that position. The filter itself is fixed at a particular set frequency with a number of filters being selected at different frequencies, and the interfering carrier may be shifted from frequency to frequency, thus, the system becomes much more efficient and secure.

Further, since the number of interfering carriers is only limited by the headroom or power transmitted by an over-the-air station, alternately shifting the interfering carrier allows the use of multiple interfering carriers within the power limits of the transmitted signal. This produces a much more efficient transmission system, but also allows a substantial increase in the security which is nearly impossible to defeat.

When using two, three or more interfering carriers they are only on for intermittent periods of time, and while their effect would be identical to several interfering carriers the transmitter power would not have to be increased. The multiple interfering carriers could be generated by separate oscillators turned on and off, or by a single oscillator turned on and off and having its oscillating frequency shifted and then turned on again. Thus, the interfering carriers could be generated by multiple oscillators or a single oscillator shifted in frequency at intermittent periods of time.

To a pirate there would be no way of telling whether the interfering carriers are generated by multiple oscillators or by a single oscillator shifted in frequency. Further, they would be unable to tell where the interfering carrier is at any particular time and while they may design a filter to remove a carrier at one frequency the difficulty of providing notch filters at the multiple frequencies increases the security substantially.

The principal behind using alternately shifting interfering carriers is to further enhance security over a single interfering carrier. The security will be nearly the same as if three continuous interfering carriers were used. If a pirate manages to make two imperfect filters to remove interfering carriers he would have carriers left over if three or more were used.

In the case of using a single interfering carrier shifted around, the picture in theory will only be scrambled one third of the time. However, if the switching is done fast enough it will have the appearance of being scrambled continuously because there will be a flicker effect. What might be lost to several continuous interfering carriers will be gained in the flicker effect of moving the carrier around which will be just as disturbing to the viewer. The effect on the actual picture will not be the same as using three continuous carriers, but its effect in practical terms will be substantially similar such that a viewable picture could not be obtained.

Another advantage of using alternately shifting interfering carriers is that less "headroom" is necessary than would be needed if there were multiple continuous interfering carriers. That is, the power of the transmitted signal would have to be increased according to the number of interfering carriers used. Thus, if three interfering carriers were used the amount of power would have to be increased threefold. In some cases the license for transmissions of an over the air station would not allow sufficient power to radiate multiple continuous interfering carriers. With alternately shifting interfering carriers the station would be allowed to stay within the acceptable limits and still obtain, essentially, the effect of multiple continuous interfering carriers. An additional advantage is that the saving in transmitted power would also reduce the cost of transmitting the signal with the interfering carrier.

A different code or interfering technique could be used for each program, thus the system would lend itself to be used very effectively for "Pay-per-View" programs.

In the "Pay-per-View" area the encoder can be very quickly modified to produce particular scrambling signals. Decoders at the subscriber's receiver will have receptacles or slots for receiving modules containing filters to remove the interfering signals coded for that particular program. The large number of codes available and frequent changing from one code to another will effectively prevent the subscriber from attempting to capture the scrambled television signal transmission. Even if a potential pirate would have all modules available, it would be very difficult to find out which particular set would be needed for the specific program.

The filters necessary to decode the signal will be very narrow band rejection filters. The relative bandwidth of those filters, defined as the ratio of the 3 dB bandwidth to that of the center frequency, will range from about 0.0001 for the lower T.V. channels to about 0.00002 for the high VHF channels. This will require selective devices with a Quality Factor Q of respectively 10,000 to 50,000. Those Q's are unobtainable with standard components which have a Q which seldom exceeds a few hundred. Only acoustic devices, made on single crystals can be used and currently Quartz is the only commercially available material to have the necessary temperature and time stability. However any expert in the field can identify other solid state materials, as for instance Berlinite, which could be used in the future.

Initially the filters are made of Quartz and a variety of technologies can be used to fabricate the filters. A single pole filter can be made from a single Quartz crystal resonator and a few very simple components. A filter made of several resonators can be fabricated on a single crystal element by a technology which is known as monolithic filters.

Due to the high frequencies involved the Quartz elements are very thin (of the order of a few thousands of an inch for the lower VHF frequencies) while the other dimensions of the crystal are a very small fraction of an inch. The amount of Quartz needed is therefore very small and the material cost is low but the required precision makes it next to impossible for a pirate to fabricate those parts without the necessary equipment and know-how.

For the higher VHF frequencies and for frequencies beyond VHF Surface Acoustic Wave (SAW) Filters may be more appropriate. SAW filters are fabricated by lithographic processes on relatively thick and sturdy substrates and are therefore more suitable for higher frequencies.

Expressed in electrical terms those filters will have a rejection band attenuation greater than 40 dB over a bandwidth of 500 to 4000 Hertz and a 3 dB bandwidth which is ideally 5 kHz or less, but which can be as large as 20 kHz. The lower values for bandwidth are for the low channels in the VHF band while the high values pertain to the high VHF TV channels. The values mentioned will allow for reasonable fabrication tolerances, temperature and aging variation, though they are known to be small. The temperature dependence of Quartz is less than $+/-$ 1 part per million for a temperature range of 15° C. to 30° C. corresponding to a variation of about 50 Hertz at T.V. channel #2. Ageing can be expected to be considerable less. Quartz crystals can be fabricated to an accuracy of better than 100 Hertz.

Even for the filters with a very small 3 dB bandwidth some distortion of the bands with the high spectral intensity, centered at the harmonics of the horizontal frequency, will take place. Even if the 3 dB bandwidth is 6 kHz, the 1 dB bandwidth may be 15 kHz. Furthermore it is known that the phase distortion is just as important in video transmission and phase distortion can often be noticed before amplitude distortion is noticeable.

To counteract the effect of amplitude and phase distortion an amplitude and phase compensation will be used in the transmitter. The use of such amplitude and phase compensation together with very stable notch filters will assure a near perfect decoded signal while providing "hard" security.

Quartz devices can be manufactured to very high tolerances. By manufacturing the devices for a target frequency slightly above the final desired frequency and by trimming the devices to their final value, very high yields can be reached. This trimming is done with automated, computer controlled equipment.

The very distinct advantage of this system is that it offers to the television cable industry a low cost secure television transmission system that will make "Pay-per-View" a practical alternative.

The above and other novel features will be more fully understood from the following detailed description and the accompanying drawings, in which:

DETAILED DESCRIPTION OF THE INVENTION

Figure 1:
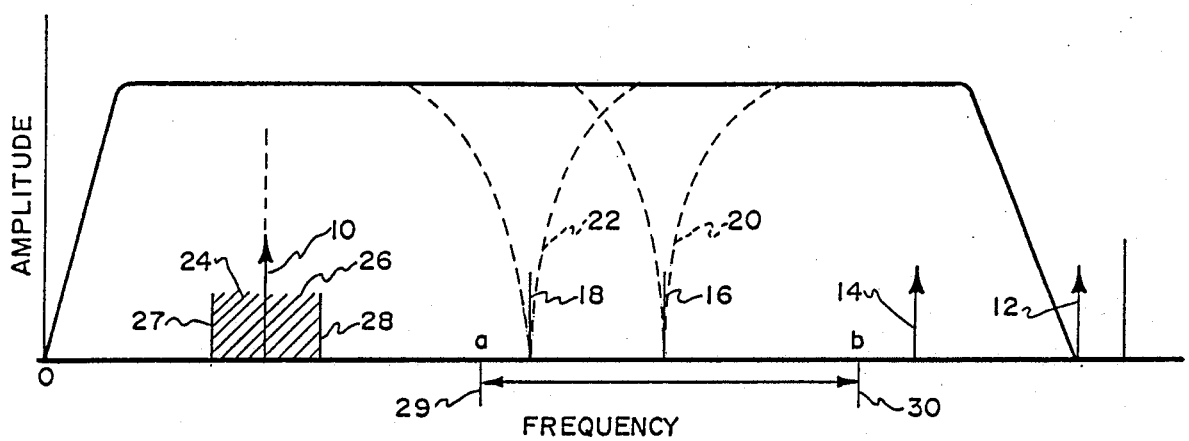
FIG. 1 is a graph of the frequency response of a television transmission system

The system of the present invention provides a more fully secure T.V. transmission system and is illustrated graphically in FIG. 1 which represents the band of a standard T.V. channel of 6 MegaHertz (MHz). Video carrier 10 is 1.25 MHz from the lower band edge indicated as zero. The audio and color carrier indicated as 12 and 14 are respectively 4.5 MHz and 3.58 MHz above the video carrier.

The T.V. scramble system disclosed and described in the above mentioned Patent, produces scrambling by inserting an interfering carrier or signal 16 typically halfway between video and audio carriers 10 and 12 at 2.25 MHz above the video carrier. A second option is an offset possibility indicated at 18 at approximately 1.5 MHz away from video carrier 10. Both of those frequency slots are related in a simple mathematical way to both video and audio carriers; therefore an interfering carrier at those frequencies will disrupt both picture and sound.

The approximate frequency response of a typical decoder used in the system of the above referenced patent is indicated in dotted lines at 20 and 22. This decoder is produced using coils and capacitors in a filter network to produce a band rejection filter having a substantial bandwidth. The purpose of the decoder is to reduce the interfering carrier as much as possible, while at the same time minimally affecting the video carrier.

As shown, the band rejection of the filters produced with discrete circuit components is relatively poor because the 3 dB and 10 dB bandwidths are relatively wide. So the major disadvantage of the system is that the interfering carrier must be kept far from the video carrier to be able to successfully remove the interfering carrier to restore the signal.

The result is that amateurs, experimenters and technicians with a minimum knowledge can build filters with discrete components that will remove the interfering carrier, allowing easy pirating of the T.V. transmissions. Further, since the bandwidth 20 and 22 rejection filters are relatively wide, as much as several MHz at the 3 dB point to a few hundred kHz at the rejection bands, serious degradations in the quality of the picture can result. As a consequence subscribers to a Pay T.V. Channel would get degraded picture quality compared to standard television transmissions.

The second problem mentioned above is that a relatively crude filter could remove a sufficient portion of the interfering carrier to give a pirate a watchable video and usable audio. While the typical quality obtained by the pirate was poor, he did not have to pay the usual charge. Because there was typically only one code, the incentive to pirate was even greater.

Offset carrier 18, being even closer to the video carrier was plagued with even more video degradation because decoders tend to take out a substantial portion of the carrier in addition to a substantial amount of the low frequency video components, resulting in very poor pictures.

A further disadvantage of the system is that filters consisting of many discrete parts are expensive to manufacture.

Thus the previous system had many serious drawbacks and technological compromises had to be accepted in order for the system to be practical and to be accepted by the operator and the subscriber.

The present system was developed to eliminate most or all of the shortcomings of prior art systems and will provide a system having greater or "hard" security. "Hard" security is defined as security which is difficult to defeat with conventional means. The system of the invention will also eliminate most of the degradation of the picture and sound occurring in previous systems while at the same time making the decoders, for use by subscribers, lower in cost.

This is achieved by using very sophisticated, solid state technology in the construction of the decoders which will achieve deep and very narrow notches in the band rejection filters. Those filters will permit the placement of the interfering carriers extremely close to the video carrier.

It is intended that the scrambling carriers be placed into bands 24 and 26 which are approximately 300 kHz wide above and below video carrier 10. Those bands extend from 27 to 28.

The distinction between the prior art and the present invention is illustrated in FIG. 1. Prior art systems place an interfering carrier in the band ranging from 29 through 30 which is the middle part of the band extending from video carrier 10 to sound carrier 12. The present invention, by utilizing solid state technology and compensating techniques, to be discussed in the following, plans to use a 600 kHz band extending from 27 to 28.

Figure 2:
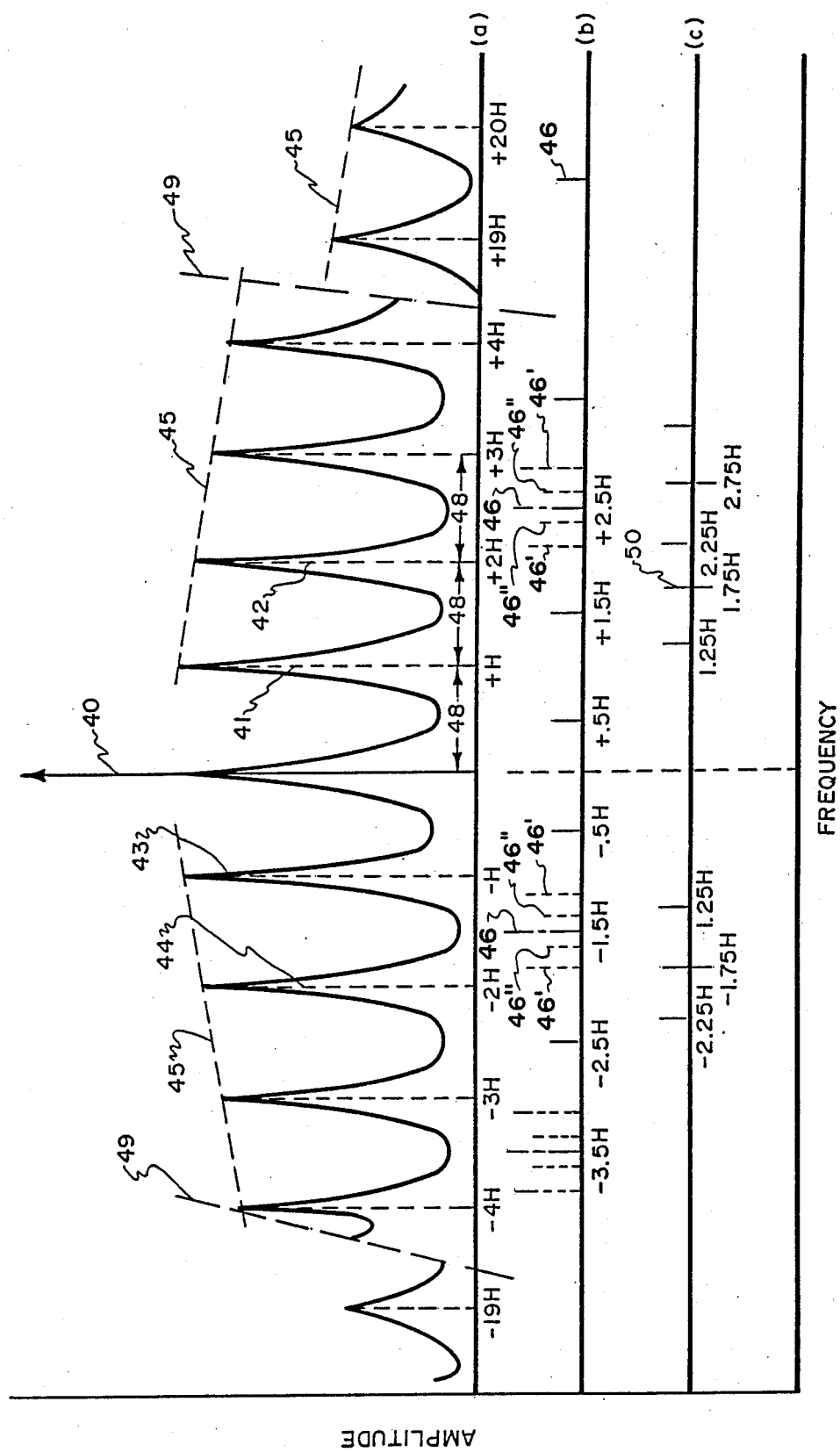
FIG. 2 is an expanded view of the frequency spectrum around the video carrier for a television transmission system.

This band is shown on an enlarged scale in FIG. 2. line (a) of FIG. 2 shows the spectrum around T.V. video carrier 40 of a typical T.V. scene. As shown, the spectrum intensity of a typical scene increases and decreases periodically with periodicity 48 of 15,734 Hz or "H" HZ where H stands for the horizontal frequency. Typically the spectral intensity is high for harmonic multiples of the horizontal frequency and low in between those harmonics.

The first sideband harmonics of the horizontal frequency "H" Hz above and below video carrier 40 are indicated at 41 and 43 respectively. The upper and lower sideband's second harmonics are respectively indicated at 42 and 44. The envelope indicated at peaks is 45; typically the envelope decreases for higher values of the harmonic.

In order to show detail only a few harmonics have been shown between lines 49, a few higher harmonics have been shown schematically. It should be pointed out that the spectrum will strongly depend on the particular scene and FIG. 2 is only to indicate the general nature of the spectrum.

Line (b) of FIG. 2 shows the preferred locations of scrambling signals, which is between the harmonics where the spectral intensity is typically low. A specific location of 1.5 H Hz above video carrier 40 is shown at 46 but any of the locations in proximity to $(n+0.5)*H$ Hz would be acceptable. The integer n ranges from $-20$ to $+19$ to correspond to a band of approximately 600 kHz around the video carrier. If the decoder 3 dB bandwidth of the filter is narrower than 15,734 Hz (H) not much video information will be lost, because the spectral intensity is low where the filter is effective.

In some older cable T.V. distribution systems intermodulation is somewhat high, typically due to incorrect channel levels or amplifiers with limited power handling capabilities. Typically second and third order distortion products are the most important type of intermodulation products present. If in a transmission system strong frequency components with frequencies $f_1$, $f_2$, $f_3$ ... $f_n$ are present second order intermodulation will create components with frequencies $f_j+f_k$ and $f_j-f_k$.

Third order distortion will cause components with frequencies $f_j f_k f_e$. One form of such an component is $2f_s-f_v$ where $f_s$ is the scrambling carrier and $f_v$ is the video carrier. It can easily be shown that if the scrambling carrier is located a frequency distance (delta) above (or below) the video carrier, the spurious component $2f_s-f_v$ will fall 2 above (or below) that carrier. Although those spurious components are expected to be small, their presence can reduce the video quality.

Low amplitude signals which fall close to an harmonic of the horizontal frequency are about 20 dB more obvious to the viewer than signals which fall in-between those harmonics. If the scrambling signal is located at a half harmonic as indicated at 46 in scale b of in FIG. 2 the third order intermodulation product $2f_s-f_v$ will fall on an harmonic. The scrambling signal will be filtered out in the decoder but the intermodulation signal will not be filtered. Its presence may reduce the overall picture quality.

In those isolated cases the scrambling frequency allocation indicated in line (c) of FIG. 2 may be preferred. The scrambling carriers and therefore the center frequencies of the decoder filters are then optimally located 0.25 *H Hz from the harmonics of the horizontal frequency H and one specific location 50 is indicated at 50. In general the scrambling carriers will be in the vicinity of (0.25+m/2)*H above the video carrier where m is an integer ranging from −40 to +39 corresponding to a band of 600 kHz centered around the video carrier 40.

With this allocation the intermodulation products $2f_s-f_v$ will now fall at a half harmonic of the horizontal frequency and will be 20 dB less obvious to the viewer. In the frequency allocation for the scrambling carrier shown in line (c) of FIG. 2 the scrambling carriers are about 4 kHz away from the spectral peaks around the horizontal frequency and the narrow filters in the decoder will not cause much distortion by destroying important video information.

The interfering carriers, indicated at 46 in FIG. 2, are preferably modulated in encoder 62 (FIG. 3) to enhance the scramble effectiveness. Modulation will produce a flicker effect which can be irritating to a viewer and will enhance the security because an imperfect filters designed by a pirate to attempt to get a viewable picture will leave a residual flicker which a customer will find unacceptable. Modulation would produce an interfering carrier having a bandwidth indicated approximately at 46' on either side of the center frequency 46 of the interfering carrier.

Preferably a single modulating carrier in the range of 75 to 100 hertz with a frequency of 85 hertz would be used. However, the bandwidth of the modulation could be up to near the bandwidth between adjacent harmonics, or approximately 16 kilohertz. Thus, a modulation signal of approximately 8 kilohertz would produce an interfering carrier bandwidth approximately equal to the bandwidth between adjacent harmonics.

As a practical matter, however, the bandwidth of the interfering carrier should be no more than about the bandwidth of the notch filter to assure complete removal at the receiver. This means that the modulation signals should be less than one half the bandwidth of the notch filter. For example, for a notch filter of approximately two kilohertz a modulating signal less than one kilohertz would be desired to allow some padding on either side of the bandwidth of the interfering carrier. This will allow some room for drift or error in the notch filter or modulating signal bandwidth.

A signal that provides the security required and the optimum flicker is a modulation signal of approximately 85 hertz. This will produce a interfering carrier bandwidth of approximately a plus or minus 85 hertz, or in the range of 170 hertz as indicated at 46'.

To enhance the flicker effect even further it was discovered by experimentation and analysis that a particularly effective method of modulation is by using dual frequency modulation. This type of modulation increases the flicker substantially and further enhances security. The second modulation signal is preferably at a lower frequency than the first modulation signal so the bandwidth of the interfering carrier is not increased substantially.

For a dual frequency modulation a first modulation of up to about 100 hertz would be supplemented by a second modulation carrier of approximately up to 20 hertz. Modulation at 20 hertz would produce a second interfering carrier bandwidth indicated at 46'' of approximately 40 hertz. The dual modulation technique further increases and enhances the flicker effect making it even more difficult for the potential pirate to restore a viewable picture. With dual frequency modulation the interfering carrier will have two bandwidths indicated at 46' and 46'' of FIG. 2 with the maximum bandwidth being that of a multiple of the higher frequency modulation of the interfering carrier. For example, for an interfering carrier modulation of approximately 100 hertz, the bandwidth of the modulated interfering carrier 46' would be approximately 200 hertz.

The security system can be further improved as stated previously by using multiple interfering carriers which are then filtered by multiple notch filters at the receiver. The multiple interfering carriers can be simultaneously inserted between any adjacent harmonic such as that indicated in FIG. 2 at −3.5h, −1.5h or +2,5h. Three, four, five and as many interfering carriers as desired and practical can be used.

The efficiency of multiple interfering carriers can be further improved by using a single interfering carrier shifted in frequency so that it has the effect of multiple interfering carriers. Thus, an interfering carrier, for example, at −1.5h would be shifted perhaps to +2.5h and then to −3.5h effectively appearing as though there were three interfering carriers. The potential pirate would not know that there were not three interfering carriers because they could be shifted in time such that they would appear to be there all at the same time. This multiple shifting interfering carriers would also enhance the flicker effect of the received television signal.

An additional advantage of shifting interfering carriers is that the maximum power output of the transmitter could remain the same without adding additional power to transmit multiple interfering carriers. Thus, by producing a single interfering carrier which is shifted from frequency to frequency any attempts by a pirate to determine the frequency of an interfering carrier would be almost completely thwarted. Further, this would achieve the effect of multiple interfering carriers while saving in costs of power output as well as efficiency.

The shifting multiple interfering carriers at −2.5h, −3.5h and +2.5h could be generated by three separate oscillators or by a single oscillator which is turned on at say the frequency −1.5h turned off and then shifted and turned on again at +2.5h, turned off and then shifted and turned on again at −3.5h. The speed at which the switching and turning on and off is accomplished could be fast enough that it would appear that the signals were there substantially all of the time. Thus, even if a pirate were to produce a filter that might remove the signals at −1.5h and +2.5h, he would still have a left over interfering carrier at −3.5h.

At the receiving end, notch filters at each of these frequencies would be provided which would not substantially affect the received television signal. However, the pirate would not know that there were not three interfering carriers and the opportunity to design a filter to remove all the shifting interfering carriers would be extremely difficult. The security of the system is thus substantially enhanced and improved by the shifting of interfering carriers to give the effect of multiple continuous interfering carriers, while reducing the cost of transmitting the television signal with continuous interfering carriers.

Figure 3:
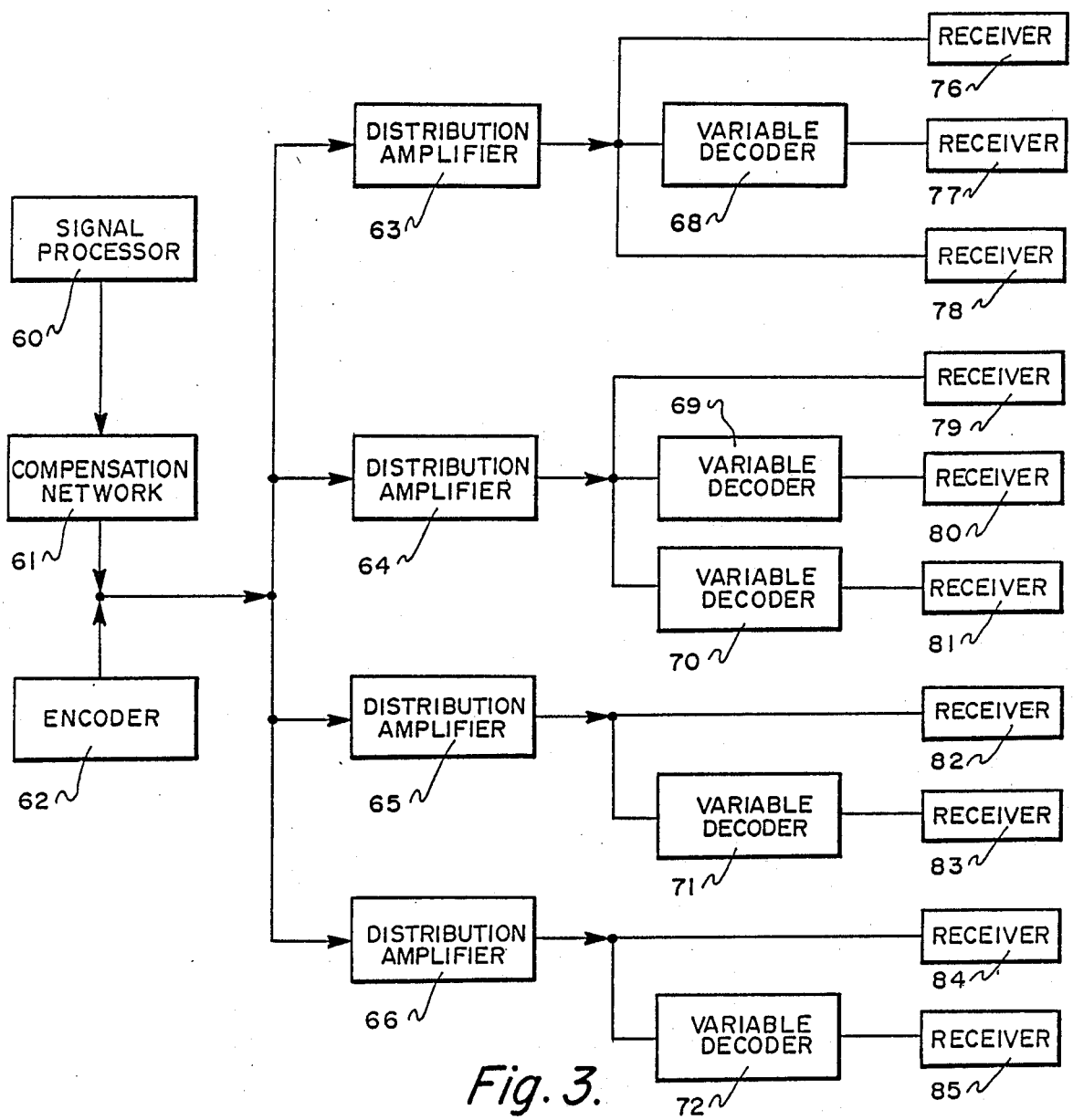
FIG. 3 is a block diagram of a fully secured system constructed according to the invention.

FIG. 3 shows a block diagram for cable T.V. distribution system with Pay Channels according to this invention. Encoder 62 modulates and injects one or more modulated scrambling carriers or signals into the RF signal produced by the Channel Signal Processor 60 which passes through a Compensation Circuit 61 (to be discussed hereinafter). This signal is transmitted to distribution amplifiers 63 through 66 which will service a number of subscribers with receivers 76 through 85. Each subscriber who subscribes for premium pay programs will have a variable decoder 68 through 72. In a variable decoder, decoder frequencies can be easily changed by removing and changing small filter modules. A module with a specific code could be used for continuous programming on a Premium Pay channel which for instance could show movies. The decoder would have one or more slots for "Pay-per-View" programs. The subscriber will simply pay a small fee for a particular coded filter module which he will insert into the decoder to be able to receive a specific program.

Figure 4A:
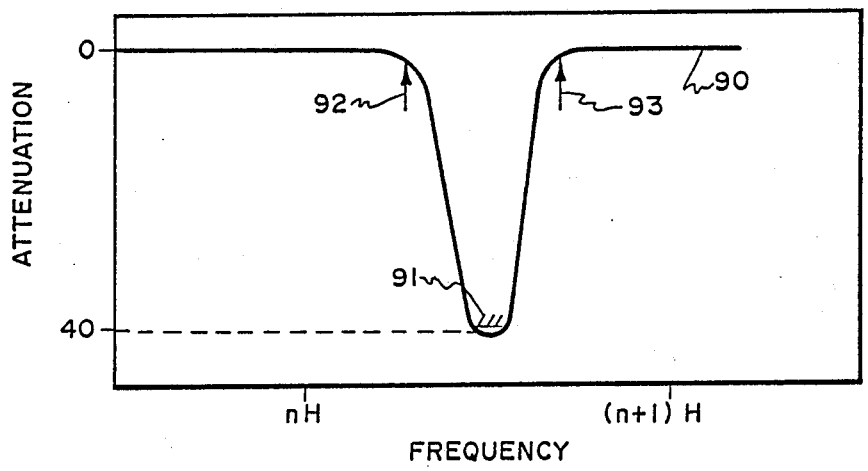
FIG. 4(a) is the desired frequency response for a decoder filter of a typical system.

The desired frequency response for a filter in the decoder is shown in FIG. 4(a). FIG. 4(a) shows the response for a scrambling carrier located as shown in line (b) of FIG. 2. The response 90 is for a band elimination filter having a rejection band 91 with a required minimum width ranging from 500 Hz to 4000 Hz depending on the center frequency of the filter and the specific technology used for making the filter. The 3 dB points 92 and 93 should be such that the 3 dB bandwidth will range between 5 and 20 kHz, again depending on center frequency and filter construction.

Figure 4B:
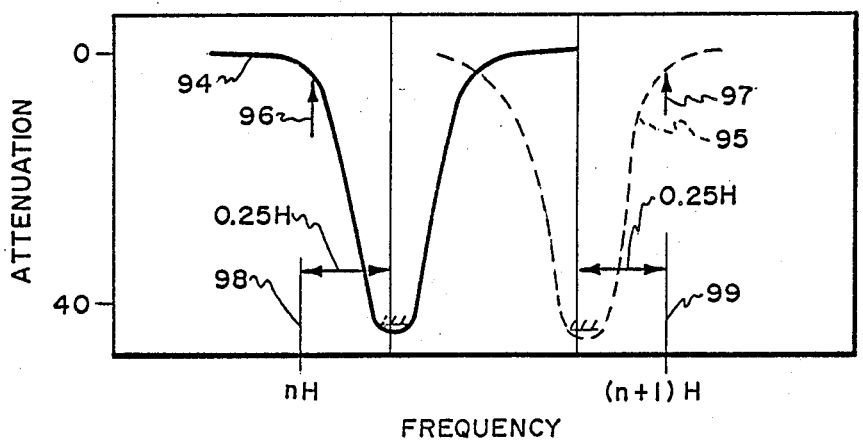
FIG. 4(b) is the desired frequency response for a decoder filter of a system with high intermodulation.

FIG. 4(b) shows the desired frequency response for a scrambling carrier located as shown in line (c) of FIG. 2. Response 94 shows the frequency response for a scrambling carrier located 0.25*H Hz above an harmonic of the horizontal frequency; the response 95 shown dotted is the response for a filter 0.25*H Hz below an harmonic of the horizontal frequency.

Scrambling carriers not located at the center between harmonics require deeper decoder filters with an attenuation of approximately 50 dB. The 3 dB point 96 should preferably fall above the near harmonic of horizontal 98 with the frequency nH such that the video information around the harmonics is not too heavily attenuated. The 3 dB point 97 of response 95 should preferably be below the harmonic 99 with the frequency (n+1)H for the same reason.

For background information FIG. 5 shows some typical elements which will be used in the Solid State, High Technology filters.

Figure 5A:
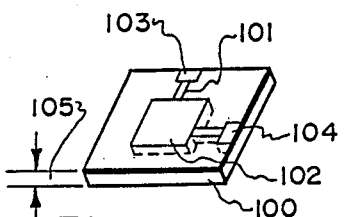
FIGS. 5(a–d) illustrate several solid state elements which exhibit very high selectivity FIGS. 6(a–f) are schematic diagrams of typical filter configurations for decoders according to the invention.

A Quartz resonator is fabricated on a Quartz substrate 100 as shown in FIG. 5(a). The frequency of the resonator is determined by thickness 105 which has to be accurate to a few parts in a million. If the resonator operates in the third overtone, the thickness will be about 0.004 inch for a T.V. channel 2 filter. The technology to accomplish these tasks is available at low cost in the Quartz filter industry. Electrodes 101 and 102 are deposited on either side of the substrate with electrically attached bonding areas 103 and 104 provided to connect electrical wires to the terminals on the package.

Figure 5B:
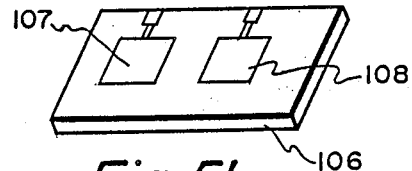

Two resonators 107 and 108 on a substrate 105 are shown in FIG. 5(b). By carefully controlling the electrode material and mass, the acoustic energy will be confined to the electrode segment of the substrate and the mutual resonator coupling can be made very small. Two (or more) decoupled resonators can be made on a single substrate with this technology which is known in the profession as Monolithic Technology.

Figure 5C:
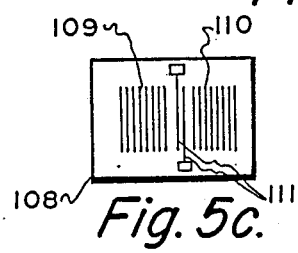
Figure 5D:
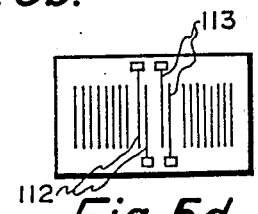

A Surface Acoustic Wave (SAW) device is shown in FIG. 5(c). Here the thickness of the substrate 108 is immaterial and the substrate can be relatively thick and sturdy. The device contains transducer 111 made of one or more interdigitated metallic fingers enclosed by two arrays of reflectors 109, 110. Reflectors 109, 110 are either made by thin metallic electrodes or by etching grooves by means of plasma etching or other solid state manufacturing techniques. Typically all the patterns are made by photo lithographic processes, which makes it possible to fabricate the devices at low cost. The linewidth for a high VHF filter is of the order of three microns. Therefore the equipment to fabricate those devices is very costly and the operators are extensively trained. Therefore it is near impossible for even skilled electronic technicians to make devices of this type. A SAW device with two transducers 112 and 113 is shown in FIG. 5(d) which allows deep notch filters to be made without the use of inverting transformers.

Figure 6A:
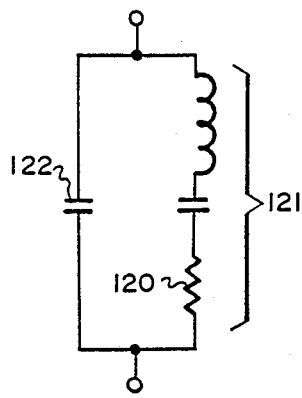

Several filter geometries to make band rejection filters are shown in FIGS. 6(a) through (f). FIG. 6(a) is the electrical equivalent circuit of a Quartz resonator of the type shown in FIG. 5(a) or a SAW resonator as shown in FIG. 5(c). It contains series resonant circuit 121, resonant at the resonator frequency, with series resistor 120. Paralles capacitor 122 represents the capacity between the electrodes. The circuit exhibits a series resonant behavior at the series resonant frequency followed by a parallel resonance at a somewhat higher frequency. The parallel resonance comes about by interaction of series resonant circuit 121 with parallel capacitance 122.

Figure 6B:
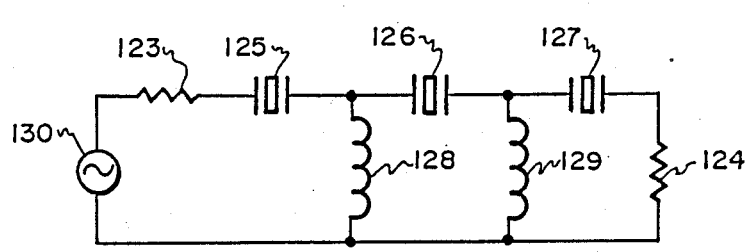

One particular rejection band filter configuration is shown in FIG. 6(b). The filter is connected to source 130 by a source resistor 123 and to load resistor 124 and consist of three resonators 125, 126, and 127 coupled by two inductors 128 and 129. The filter exhibits an attenuation band at the parallel resonance frequency of the resonators band.

Figure 6C:
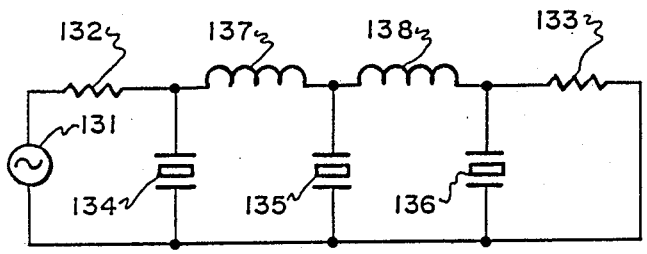

The structure shown in FIG. 6(c) is inverted compared to FIG. 6(b). The filter is connected between a source 131 with its source resistor 132 and load 133. Again the filter shown here has three resonators 134, 135 and 136 coupled by two inductors 137 and 138. The rejection band of this filter occurs at the series resonance frequency of the resonators.

Figure 6D:
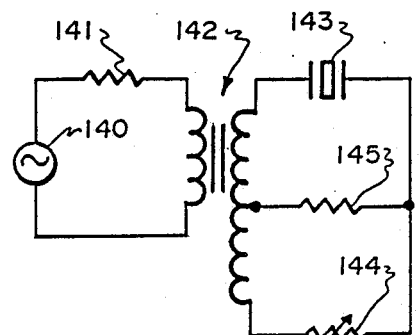

A balanced band rejection filter between source 140 with its source resistor 141 and a load resistor 145 is shown in FIG. 6(d). It contains balancing transformer 142 with a mid-tap, a resonator 143 and balancing resistor 144. By setting balancing resistor 144 equal to the resistance of resonator 143 at either series or parallel resonance the output signal can be made zero at the particular resonance frequency. The advantage of a filter of this type is that at the resonance frequency the attenuation is infinite.

Figure 6E:
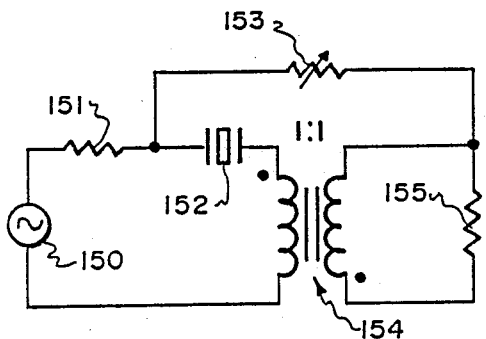
Figure 6F:
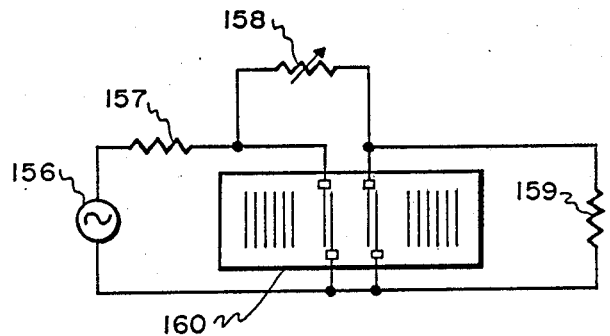

A different form of a balanced filter is shown in FIG. 6(e). Here the filter is in-between source 150 with its source resistor 151 and load resistor 155. The filter contains inverting transformer 154, resonator 152 and balancing resistor 153. Balancing resistor 153 can again be adjusted to the resistance of resonator 152 at either the parallel or series resonance. The SAW resonator of FIG. 5(d) can replace resonator 152 and inverting transformer 154 as shown in FIG. 6(f). In FIG. 6(f) source 156 is connected through balancing resistor 158 to load resistor 159. Two terminals of an 180 degree SAW resonator 160, one from each transducer, are connected to either side of balancing resistor 158 while the two other transducer terminals are grounded. The balancing resistor can be adjusted to the resistance at either the series or parallel resonance of the SAW resonator to obtain a bandstop filter.

Figure 7:
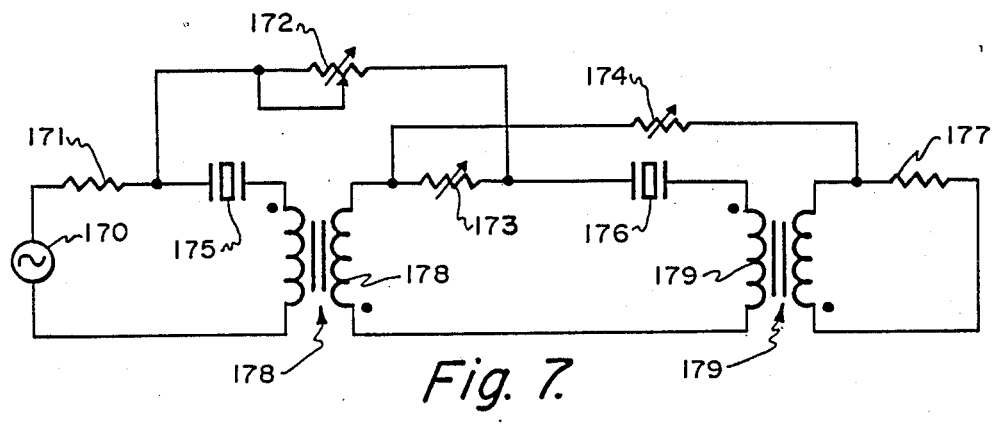
FIG. 7 is a schematic diagram of two filter elements with mutual resistor coupling for use in a decoder according to the invention.

A filter arrangement proven to be very effective bandstop filters with deep notches is shown in FIG. 7. It basically consists of two cascaded filter circuits, as shown in FIG. 6(e), having mutual coupling resistor 173. In the filter shown source 170 is coupled through source resistor 171 to a series arrangement of balancing resistors 172, 173 and 174 to load resistor 177. The filter contains two resonators 175 and 176 which are connected through inverting transformers 178 and 179.

If initially coupling resistor 173 is set to zero, the filter degenerates into a set of two cascaded bandstop filters. By means of balancing resistors 172 and 174 each filter can be adjusted to have a very deep rejection band. Those bands can be at different frequencies depending on the resonant frequencies of the resonators. The rejection bands can be made to move towards each other by increasing the value of coupling resistor 173 together with decreasing the value of resistors 172 and 174.

This procedure can be used to obtain a large number of different frequency responses from one specific set of resonators. It can also be used to utilize a large number of devices, which have a frequency spread of e.g. 0.01%, for the fabrication of filters in which the rejection band has to be exactly at the same frequency.

Figure 8A:
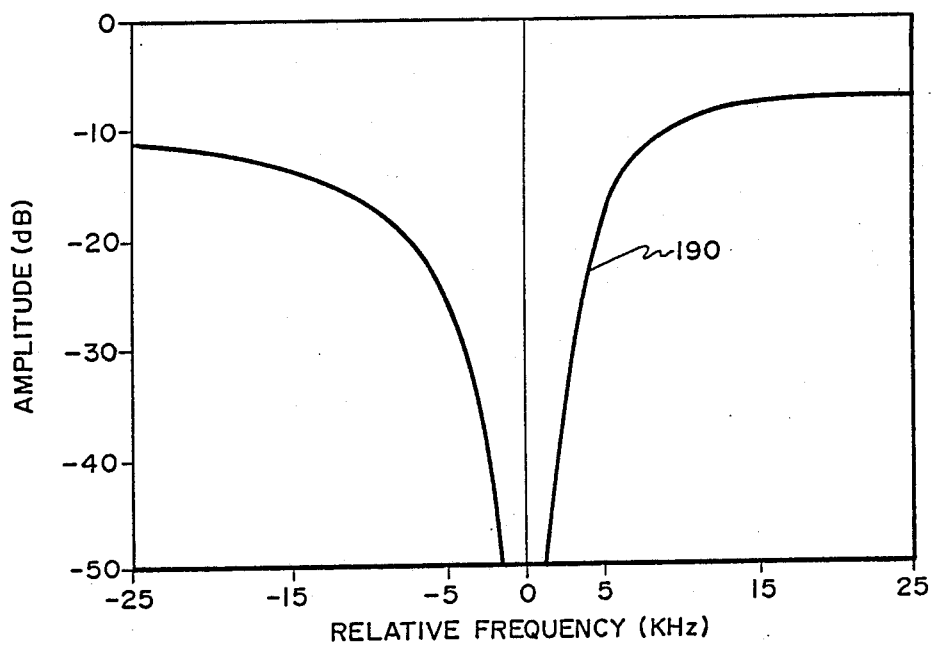
FIGS. 8(a) and (b) are graphs of typical filter responses constructed according to the invention.
Figure 8B:
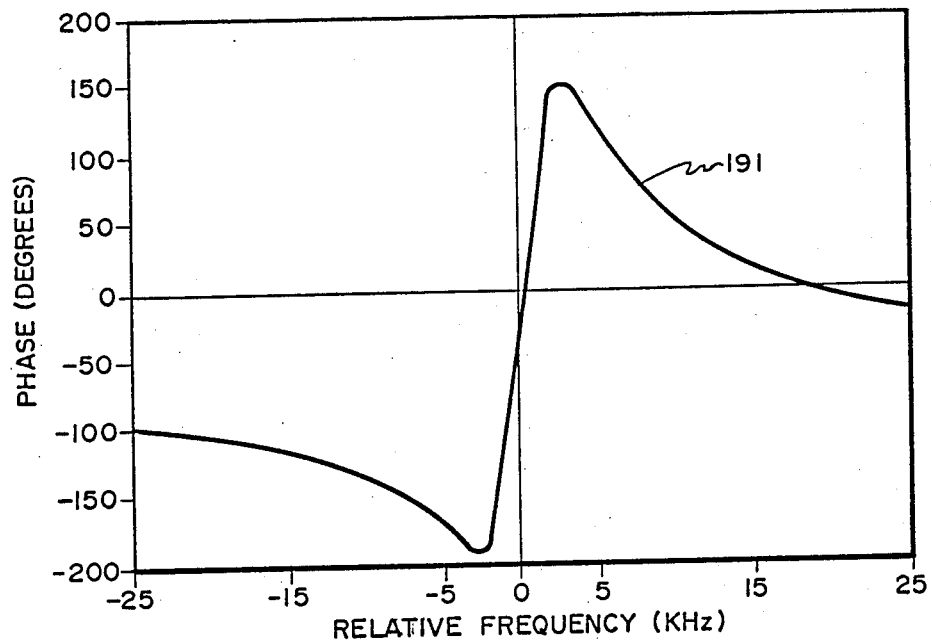

An example of a frequency response of a ladder filter with four resonators is shown in the graphs of FIGS. 8(a) and (b), constructed similar to the filter shown in FIG. 6(c). The center frequency of the filter is 83.25 MHz while the 3 dB bandwidth is about 20 kHz. Curve 190 is the amplitude response while curve 191 is the phase response of the filter.

The 3 dB bandwidth of this filter is relatively large and all spectral components of the modulated video signal which fall within this band will be attenuated and phase shifted. This can affect the video quality in an adverse way. By means of pre-compensation at the transmitter the overall amplitude and phase response of the system can be considerably improved, resulting in a nearly perfect decoded picture.

Figure 9A:
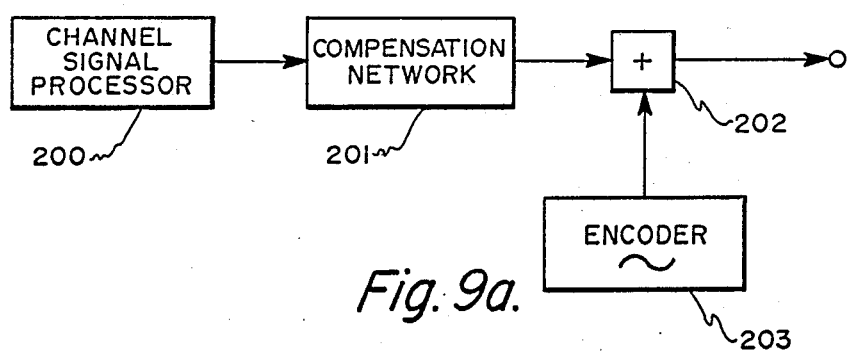
FIGS. 9(a) and (b) are block diagrams of compensation networks using negative feedback for use in the system of the invention.
Figure 9B:
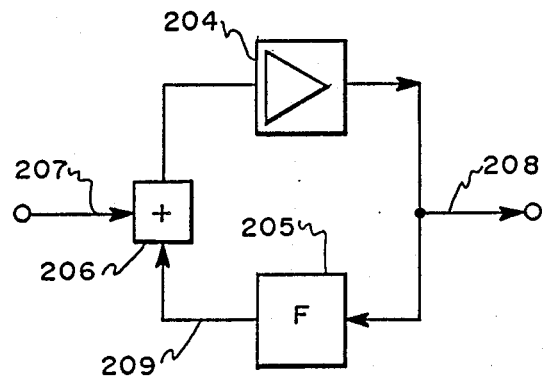

One implementation of pre-compensation is shown in FIG. 9(a). Signal processor 200 sends a signal to compensating network 201 which sends a signal to summing circuit 202 where scrambling signals generated by encoder 203 are added. (The blocks are similar to the blocks 60, 61 and 62 in FIG. 3). FIG. 9(b) shows one implementation of compensating circuit 201.

Compensation in FIG. 9(b) is obtained through negative feedback. The signal from Channel Signal Processor 200 (FIG. 8(a)) is applied to input 207 of the Compensation Network. Input 207 is connected to one of the summing inputs of summing network 206 while the other summing input 209 is the output of filter 205 in the feedback loop. The output of summing network 206 is connected to the input of amplifier 204 which has an open loop gain of $\mu_0$. The output of amplifier 204 is connected to the input of filter 205, which is identical to the filter in the decoder which has to be compensated for. The output of the amplifier 204 is also connected to output cable 208 of the compensation network.

In a feedback amplifier with an open loop gain $\mu_o$ (mu) and a feedback transfer function $\beta$ (beta) the closed loop gain $\mu_c$ is given by $$\mu_c = \frac{\mu_0}{1 + \mu_0} \tag{1}$$

In the limiting case $\mu_0 >> 1$ the closed loop gain becomes $$\mu_c = \frac{1}{\beta} \tag{2}$$

If decoder bandstop filter F is used in the feedback loop, the transfer function of the closed loop gain becomes the inverse of the response of the bandpass filter. If the filter is a bandstop filter, the closed loop transfer function will resemble a bandpass network. If the phase of the filter has a negative slope, the phase of the closed loop transfer function will have a positive slope.

Figure 10A:
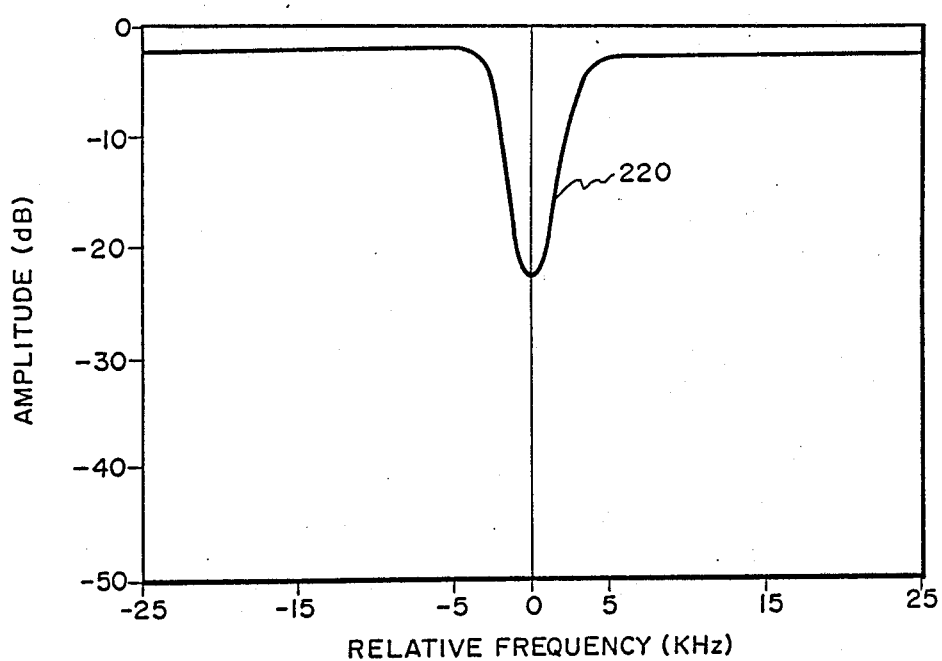
FIGS. 10(a) and (b) are graphs illustrating total response of filter and compensation network according to the invention.
Figure 10B:
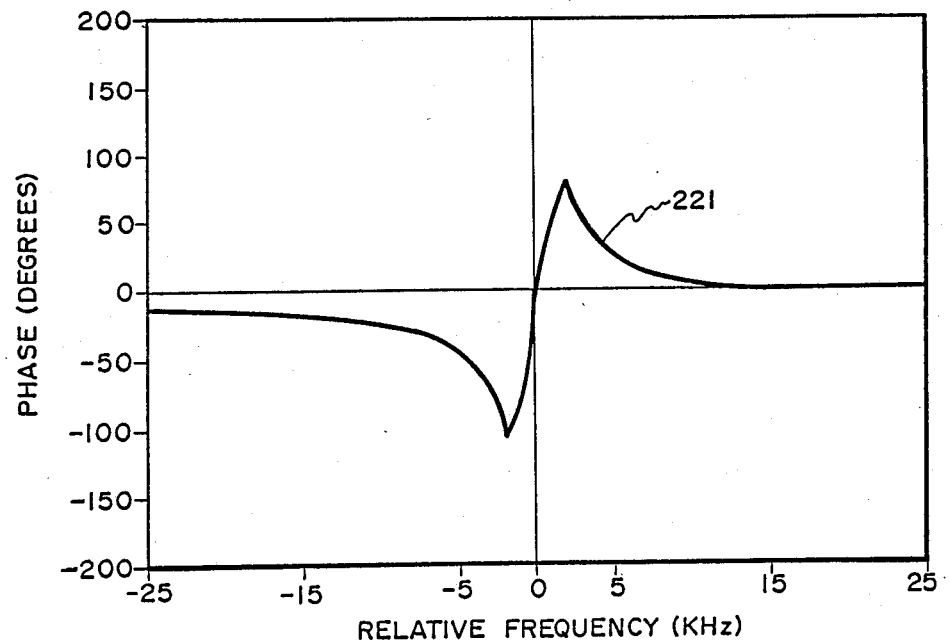

Amplitude response 220 and phase response 221 of the compensation network in series with decoder bandstop filter as shown in FIGS. 10(a) and (b). This overall corrected response gives a direct measure of the video quality to be expected. If the compensation would be 100% effective amplitude response 220 would be flat and phase response 221 would be linear.

Comparing FIGS. 10(a) and (b) with FIGS. 8(a) and (b) shows that the compensation produces considerable improvement. The 3 dB bandwidth has been reduced from about 18 to 6 kHz and the phase excursion has been reduced accordingly.

It can be seen from formula (1) that in the ideal case $\mu_0$ equals infinity ($\mu_0 = \infty$) and complete compensation takes place. In practice the amount of allowable gain is limited to prevent oscillations at some frequency where the phase excursion is 180 degrees. To be able to make further improvements the circuit shown in FIG. 11 can be used. By using double feedback a near perfect response can be obtained.

Figure 11A:
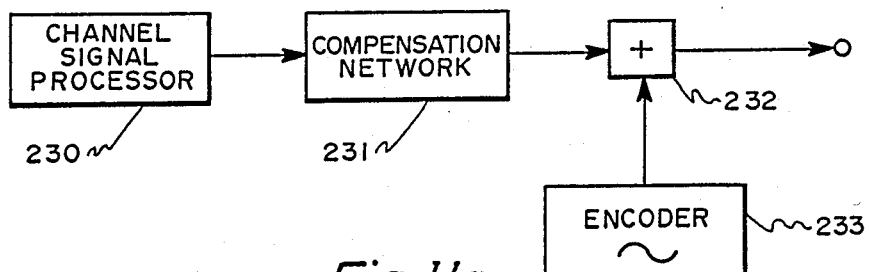
FIGS. 11(a) and (b) are block diagrams of compensation networks using double negative feedback for use in the system of the invention.

The block diagram of FIG. 11(a) shown is essentially the same as that of FIG. 9(a). Channel signal generator 230 is connected to the input of compensation network 231. The output of compensation network 231 is connected to summing network 232 in which the scrambling signals from encoder generator 233 are added.

Figure 11B:
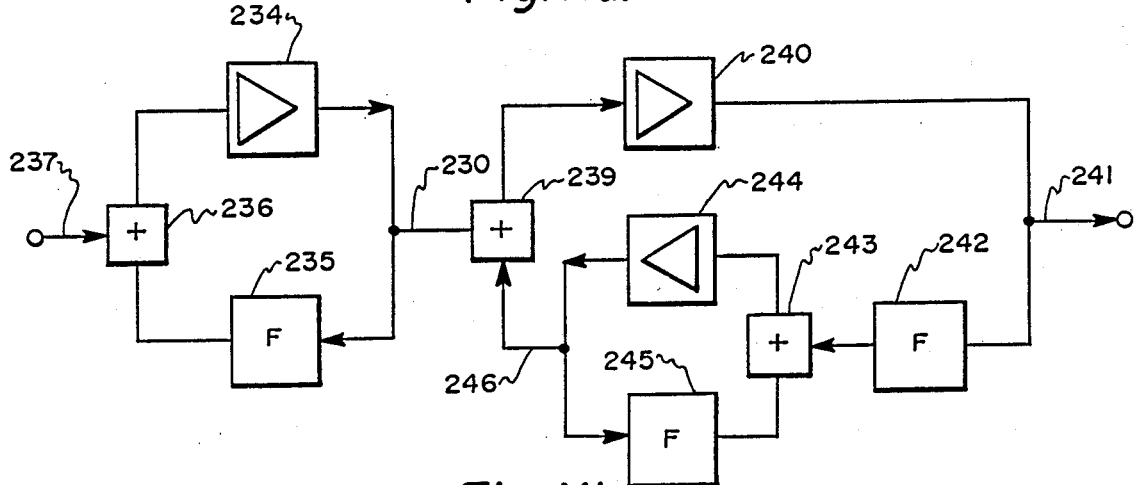

The compensation network, using double feedback is shown in FIG. 11(b). The left loop containing amplifier 234, filter 235 and the summing network 236 is identical to the network shown in FIG. 9(B). The signal output at 238 is therefore a first filter correction applied to the input signal at 237.

The second loop to the right of the first loop makes a secondary correction. It contains a tertiary loop which is a copy of the first loop with amplifier 244, summing network 243 and filter 245. This loop is connected in series with filter 242 which again is a replica of the decoder bandstop filter. The response between the input of 242 and output line 246 is therefore the overall corrected response, identical to the one shown in FIGS. 10(a) and (b). By placing those networks with the overall corrected response in the feedback loop of amplifier 240 the network between input 238 and output 241 will tend to correct the before mentioned overall corrected response. The network between input 237 and output 241 will generate therefore a double corrected response for the decoder filter.

Figure 12A:
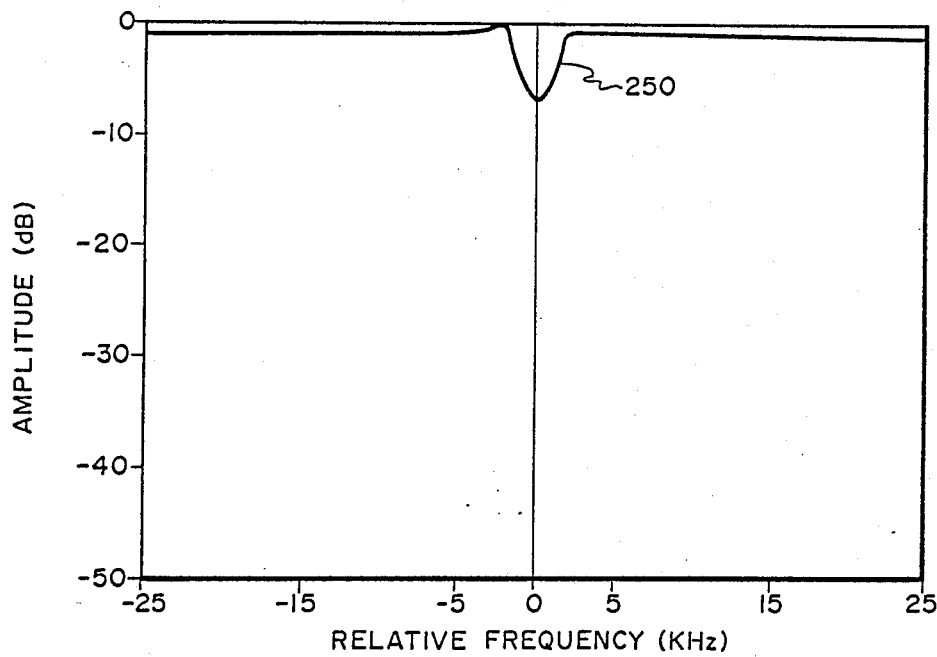
FIGS. 12(a) and (b) are graphs illustrating total frequency response using double compensation according to the invention.
Figure 12B:
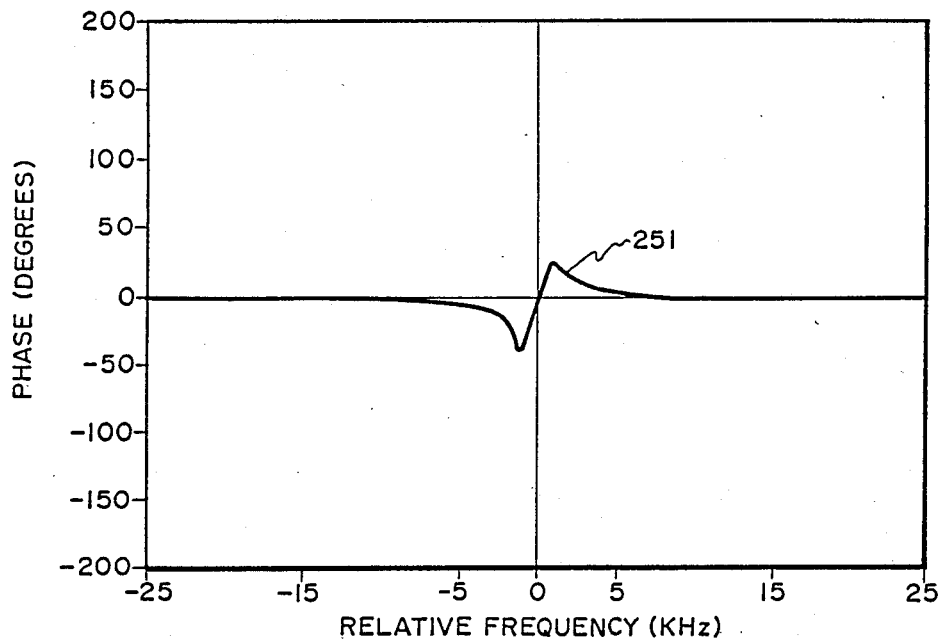

The filter response of the decoder band stop filter in series with the double compensation is shown in FIG. 12 where curve 250 is the overall amplitude response and curve 251 the overall phase response. Comparing FIGS. 12(a) and (b) with FIGS. 10(a) and (b) shows that double compensation makes a considerable improvement. The 3 dB bandwidth is now reduced to 2.5 kHz and the amplitude and phase excursions have become quite small.

For the compensation to be effective it is essential that the response of the filters is very similar.

As described, the compensation has been obtained by using negative feedback on the R.F. (radio frequency) channels. It is also possible to compensate the video signals for distortion caused by the decoder filters.

This invention is not to be limited by the embodiment shown in the drawings and described in the description, which is given by way of example and not of limitation, but only in accordance with the scope of the appended claims.

What is claimed is:

1. A television signal transmission security system comprising;
   television signal generating means generating a television signal having a video carrier and an audio carrier;
   encoder means for injecting at least one interfering signal into said television signal, said at least one interfering signal being injected into said television signal about midway between harmonics of the horizontal sweep frequency of said video carrier where spectral intensity of said harmonics is not substantial and in a frequency band including said video carrier and on either side or both sides of said video carrier;
   modulating means in said encoder means for modulating said at least one interfering signal, said at least one interfering signal with said modulation having a bandwidth of less than about the frequency bandwidth between adjacent harmonics of said horizontal sweep frequency;
   transmission means for transmitting said television signal with said interfering signal to a plurality of television recievers; and
   decoder means having notch filter means with at least one notch at each television receiver receiving and removing said at least one interfering signal, each of said at least one notch of said notch filter means having a bandwidth at 3 db down of less than about the frequency bandwidth between adjacent harmonics of said horizontal sweep frequency wherein said notch filter means does not remove a significant amount of video sideband information, allowing said television signal to be viewed at said plurality of television receivers without substantial degradation.

2. The system according to claim 1 in which said frequency band including said video carrier is approximately 300 kHz on either side of said video carrier; said at least one interfering signal with said modulation being injected at a center frequency at least approximately 6 kHz from said video carrier.

3. The system according to claim 1 in which said interfering signal with said modulation is injected at a center frequency offset from a harmonic of said horizontal sweep frequency of said video carrier which is in the range of 0.25 to 0.75 of the frequency bandwidth between adjacent harmonics of said horizontal sweep frequency.

4. The system according to claim 1 in which said interfering signal is modulated with at least one modulating signal having a frequency in the range of 75 to 100 hertz.

5. The system according to claim 4 in which said interfering signal is modulated with at least one signal at 85 hertz.

6. The system according to claim 4 in which said at least one modulating signal is a plurality of modulating signals.

7. The system according to claim 6 in which said plurality of modulating signals is two modulating signals; the second of said modulating signals being at a frequency of less than about 20 hertz.

8. The system according to claim 3 in which said interfering signal offset is one half the bandwidth between adjacent frequency components due to horizontal frequencies of said video carrier and harmonics thereof.

9. The system according to claim 1 in which said notch filter means is a monolithic piezoelectric crystal filter.

10. The system according to claim 9 in which said notch filter means is a bulk crystal filter.

11. The system according to claim 9 in which said notch filter means is a surface acoustic wave filter.

12. The system according to claim 1 in which said notch filter means produces at least a 40 dB notch having a maximum bandwidth at 3 db of approximately 20 kHz.

13. The system according to claim 12 in which said notch filter means has a minimum bandwidth at the 40 db down of approximately 500 Hz.

14. The system according to claim 10 in which said notch filter is an impedance coupled notch filter means.

15. The system according to claim 11 in which said notch filter means is an impedance coupled notch filter means.

16. The system according to claim 10 in which said notch filter means is comprised of impedance cross-coupled filter piezoelectric crystals.

17. The system according to claim 11 in which said notch filter means is comprised of impedance cross-coupled filter piezoelectric crystals.

18. The system according to claim 1 in which said encoder means for injecting at least one interfering signal injects at least two interfering signals, one of said interfering signals being injected below the video carrier, the other of said interfering signals being injected above the video carrier.

19. The system according to claim 1 in which said encoder means for injecting at least one interfering signal injects at least tow interfering signals, said two interfering signals being injected at spaced apart frequencies either above or below said video carrier.

20. The system according to claim 1 in which said encoder means for injecting at least one interfering signal injects three or more interfering signals, at least one of said three or more interfering signals being injected on the opposite side of said video carrier from the other interfering signals.

21. The system according to claim 1 in which said at least one interfering signal is an alternately injected momentary signal at multiple frequencies whereby said interfering signal appears to be multiple interfering signals.

22. The system according to claim 21 in which said multiple frequencies includes at least one frequency below the frequency of said video carrier.

23. The system according to claim 22 in which said multiple frequencies is three frequencies with two of said frequencies being below the frequency of said video carrier.

24. The system according to claim 1 including pre-compensation means for pre-compensating for distortion caused by said notch filter means;
said pre-compensation means being at said television 5 signal generating means.

25. The system according to claim 1 wherein said notch filter means is an interchangeable notch filter means whereby selected interfering signals may be changed at preselected intervals.

26. The system according to the claim 3 in which said offset is approximately 0.25 of the frequency bandwidth between adjacent frequency components due to horizontal frequencies of said video carrier and harmonies thereof.

27. The system according to claim 3 in which said offset is approximately 0.75 of the frequency bandwidth between adjacent frequency components due to horizontal frequencies of said video carrier and harmonies thereof.

28. The system according to claim 24 in which said pre-compensation means comprises;
feedback means for feeding back a portion of said television signal being transmitted;
summing means for summing said feedback signal with said generated television signal;
amplifying means receiving and amplifying the output of said summing means.

29. The system according to claim 28 in which said feedback means includes notch filter means substantially identical with said notch filter means at said receiver.

30. The system according to claim 29 including a second feedback means having a notch filter substantially identical with said notch filter means at said receiver.

31. The system according to claim 30 wherein said second feedback means includes a feedback network comprised of summing means;
filter means substantially identical to said narrow band notch filter means at said receiver; and amplifier means.

32. The system according to claim 31 including network summing means summing the output of said feedback network with the output of a first feedback means.

33. A method of securing television transmissions comprising;
generating a television signal having a video carrier and an audio carrier;
injecting at least one interfering signal into said television signal, said at least one interfering signal being injected into said television signal about midway between harmonics of the horizontal sweep frequency of said video carrier where spectral intensity of said harmonics is not substantial and in a frequency band including said video carrier on either side or both sides of said video carrier;
modulating said at least one interfering signal; said at least one interfering signal with said modulation having a bandwidth at 3 db down of less than about the frequency bandwidth between adjacent harmonics of said horizontal sweep frequency;
transmitting said television signal with said at least one interfering signal to a plurality of television receivers;
removing said at least one interfering signal at said plurality of television receivers with decoder means having notch filter means each of said at least one notch of said notch filter means having a bandwidth at 3 db down of less than about the frequency bandwidth between adjacent harmonics of said horizontal sweep frequency so that said notch filter means does not remove a significant amount of video sideband information, allowing said television signal to be viewed at said plurality of televisions receivers without substantial degradation.

34. The method according to claim 33 in which said at least one interfering signal is injected in a frequency band including said video carrier of approximately 300 kHz on either side of said video carrier, said at least one interfering signal being injected at a frequency of at least approximately 6 kHz from said video carrier.

35. The method according to claim 34 in which said at least one interfering signal is injected in said frequency at a frequency which is intermediately frequency component of horizontal frequencies of said video carrier or harmonics thereof.

36. The method according to claim 33 in which said interfering signal is modulated with at least one modulating signal having a frequency in the range of 75 to 100 hertz.

37. The method according to claim 36 in which said interfering signal is modulated with at least one signal at 85 hertz.

38. The method according to claim 36 in which said at least one modulating signal is a plurality of modulating signals.

39. The method according to claim 38 in which said plurality of modulating signals is two modulating signals; the second of said modulating signals being at a frequency of less than about 20 hertz.

40. The method according to claim 33 in which said at least one interfering signal is two interfering signals, one of said interfering signals being injected above said video carrier, the other of said interfering signals being injected below said video carrier.

41. The method according to claim 33 in which said at least one interfering signal is two spaced apart interfering signals injected on the same side of and either above or below said video carrier.

42. The method according to claim 35 in which said at least one interfering signal is three or more interfering signals with at least one of said interfering signals being injected in one of said frequency bands above and below said video carrier.

43. The method according to claim 33 including inserting pre-compensation signal means into said transmitted television signal to compensate for distortion introduced when said interfering signal is removed by said notch filter.

44. The method according to claim 43 in which said at least one interfering signal is two spaced apart interfering signals injected in the frequency band including said video carrier and either above or below said video carrier.

45. The method according to claim 33 including alternately injecting said at least one interfering signal momentary signal at multiple frequencies whereby said interfering signal appears to be multiple interfering signals.

46. The method according to claim 45 in which said multiple frequencies includes at least one frequency below the frequency of said video carrier.

47. The method according to claim 46 in which said multiple frequencies is three frequencies with two of said frequencies being below the frequency of said video carrier.

48. A television signal transmission security system comprising;
television signal generating means generating a television signal having a video carrier and an audio carrier;
encoder means for injecting multiple interfering signals into said television signal, each of said multiple interfering signals being injected into said television signal about midway between harmonics of the horizontal sweep frequency of said video carrier where spectral intensity of said harmonics is not substantial and in a frequency band including said video carrier and on either side or both sides of said video carrier;
modulating means in said encoder means for modulating said multiple interfering signals, each of said multiple interfering signals with said modulation having a bandwidth at 3 db down of less than about the frequency bandwidth between adjacent harmonics of said horizontal sweep frequency;
transmission means for transmitting said television signal with said interfering signal to a plurality of television receivers; and
decoder means having notch filter means with multiple notches at each television receiver receiving and removing said multiple interfering signals, each of said multiple notches of said notch filter means having a bandwidth at 3 db down of less than about the frequency bandwidth between adjacent harmonics of said horizontal sweep frequency wherein said notch filter means does not remove a significant amount of video sideband information, allowing said television signal to be viewed at said plurality of television receivers without substantial degradation.

49. The system according to claim 48 in which said multiple interfering signals comprise at least two interfering signals injected into said television signal, at least one of said interfering signals being injected in said television signal below said video carrier.

50. The system according to claim 49 including at least one interfering signal injected at a frequency which is outside the bandwidth of said television signal; said decoding means including notch filter means for removing said interfering signals injected outside the bandwidth of said television signal.

51. The system according to claim 48 in which said frequency band including said video carrier is from approximately 6 kHz to approximately 300 kHz away from and on either side of said video carrier.

52. The system according to claim 48 in which said interfering signal offset is one half the bandwidth between adjacent frequency components due to horizontal frequencies of said video carrier and harmonics thereof.

53. The system according to claim 48 in which each of said multiple interfering signals is modulated with at least one modulating signal having a frequency in the range of 75 to 100 hertz.

54. The system according to claim 53 in which each of said multiple interfering signals is modulated with at least one signal at 85 hertz.

55. The system according to claim 53 in which said at least one modulating signal is a plurality of modulating signals.

56. The system according to claim 55 in which said plurality of modulating signals is two modulating signals; the second of said modulating signals being at a frequency of less than about 20 hertz.

57. The system according to claim 48 in which said notch filter means produces at least a 40 db notch having a maximum bandwidth at 3 db down of approximately 20 kHz.

58. The system according to claim 57 in which said notch filter means has a minimum bandwidth at the 40 db point of approximately 500 Hz.

59. The system according to claim 48 in which said means for injecting multiple interfering signal injects at least two interfering signals, one of said interfering signals being in said frequency band below the video carrier, the other of said interfering signals being in the band above the video carrier.

60. The system according to claim 48 wherein said notch filter means is an interchangeable notch filter means whereby selected interfering signals may be changed at preselected intervals.

61. The system according to the claim 48 in which said offset is approximately 0.25 of the frequency bandwidth between adjacent frequency components due to horizontal frequencies of said video carrier and harmonics thereof.

62. The system according to claim 48 in which said offset is approximately 0.75 of the frequency bandwidth between adjacent frequency components due to horizontal frequencies of said video carrier and harmonies thereof.

63. The system according to claim 48 in which said multiple interfering signals are alternately injected momentary signals at multiple frequencies whereby said interfering signal appears to be separate multiple interfering signals.

64. The system according to claim 63 in which said multiple frequencies includes at least one frequency below the frequency of said video.

65. The system according to claim 64 in which said multiple frequencies is three frequencies with two of said frequencies being below the frequency of said video carrier.

66. A method of securing television transmissions comprising;
generating a television signal having a video carrier and an audio carrier;
injecting multiple interfering signals into said television signal; said multiple interfering signals being injected into said television signal about midway between harmonics of the horizontal sweep frequency of said video carrier where spectral intensity of said harmonics is not substantial and in a frequency band including said video carrier and on either side or both sides of said video carrier;
modulating each of said multiple interfering signals, each of said multiple interfering signals with said modulation having a bandwidth at 3 db down of less than about the frequency bandwidth between adjacent harmonics of said horizontal sweep frequency;
transmitting said television signal with said multiple interfering signals to a plurality of television receivers;
removing said multiple interfering signals at said plurality of television receivers with decoder means having notch filter means with multiple notches, each of said multiple notches of said notch filter means having a bandwidth at 3 db down of less than about the frequency bandwidth between adjacent harmonics of said horizontal sweep frequency wherein said notch filter means does not remove a significant amount of video sideband information, allowing said television signal to be viewed at said plurality of television receivers without substantial degradation.

67. The method according to claim 66 in which each of said multiple interfering signals are injected in said frequency band including said video carrier of from 6 kHz to approximately about 300 kHz away from and on either side of said video carrier.

68. The method according to claim 67 in which said multiple interfering signals are injected in said television signal at frequencies which are intermediate frequency components of horizontal frequencies of said video carrier or harmonics thereof.

69. The method according to claim 66 including modulating each of said multiple interfering signals with at least one modulating signal having a frequency in the range of 75 to 100 hertz.

70. The method according to claim 69 in which each of said multiple interfering signals is modulated with at least one signal at 85 hertz.

71. The method according to claim 69 in which said at least one modulating signal is a plurality of modulating signals.

72. The method according to claim 71 in which said plurality of modulating signals is two modulating signals; the second of said modulating signals being at a frequency of less than about 20 hertz.

73. The method according to claim 66 in which said multiple interfering signals are at least two interfering signals, at least one of said two interfering signals being injected in said television signal below said video carrier.

74. The method according to claim 68 in which said multiple interfering signals are at least three interfering signals with at least one of said interfering signals being injected in a frequency band outside the bandwidth of said television signal.

75. The method according to claim 66 in which said multiple interfering signals are alternately injected momentary signals injected at multiple frequencies whereby said interfering signals appear to be continuous multiple interfering signals.

76. The method according to claim 75 in which said multiple frequencies includes at least one frequency below the frequency of said video.

77. The method according to claim 76 in which said multiple frequencies is three frequencies with two of said frequencies being below the frequency of said video carrier.

* * * * *